US011153425B2

(12) United States Patent
Dhawan et al.

(10) Patent No.: US 11,153,425 B2
(45) Date of Patent: Oct. 19, 2021

(54) SYSTEM AND METHOD FOR PROVIDING INTERACTIVE SERVICES

(75) Inventors: Vishal Dhawan, Centreville, VA (US); Timothy M. Price, Rockville, MD (US); Manoj Sindhwani, Oak Hill, VA (US)

(73) Assignee: Xtone, Inc., McLean, VA (US)

( * ) Notice: Subject to any disclaimer, the term of this patent is extended or adjusted under 35 U.S.C. 154(b) by 210 days.

(21) Appl. No.: 12/717,865

(22) Filed: Mar. 4, 2010

(65) Prior Publication Data

US 2010/0158218 A1 Jun. 24, 2010

Related U.S. Application Data

(63) Continuation-in-part of application No. 11/514,116, filed on Sep. 1, 2006, now abandoned.

(60) Provisional application No. 60/712,808, filed on Sep. 1, 2005, provisional application No. 61/157,314, filed on Mar. 4, 2009.

(51) Int. Cl.
*H04M 1/247* (2021.01)
*H04M 3/493* (2006.01)
*H04M 1/253* (2006.01)

(52) U.S. Cl.
CPC ....... *H04M 1/2478* (2013.01); *H04M 3/4936* (2013.01); *H04M 1/2535* (2013.01); *H04M 2201/40* (2013.01); *H04M 2250/74* (2013.01)

(58) Field of Classification Search
CPC .......... H04M 1/2535; H04M 2250/74; H04M 3/4938
USPC ............................ 379/202.01, 265.09, 88.17
See application file for complete search history.

(56) References Cited

U.S. PATENT DOCUMENTS

| | | | |
|---|---|---|---|
| 5,074,923 A | 12/1991 | Offers et al. | |
| 5,323,444 A | 6/1994 | Ertz et al. | |
| 5,918,014 A * | 6/1999 | Robinson | 709/219 |
| 6,334,103 B1 | 12/2001 | Surace et al. | |
| 6,408,272 B1 | 6/2002 | White et al. | |
| 6,636,831 B1 | 10/2003 | Profit, Jr. et al. | |
| 6,738,743 B2 | 5/2004 | Shama et al. | |
| 6,757,781 B2 | 6/2004 | Williams et al. | |
| 6,829,334 B1 | 12/2004 | Zirngibl et al. | |
| 6,882,974 B2 | 4/2005 | James et al. | |
| 6,901,431 B1 | 5/2005 | Dodrill et al. | |
| 6,977,992 B2 | 12/2005 | Zirngibl et al. | |
| 6,988,070 B2 | 1/2006 | Kawasaki et al. | |
| 7,016,847 B1 | 3/2006 | Tessel et al. | |

(Continued)

FOREIGN PATENT DOCUMENTS

WO         96/20448         7/1996

OTHER PUBLICATIONS

U.S. Appl. No. 12/717,893, filed Mar. 4, 2010.

(Continued)

*Primary Examiner* — Amal S Zenati
(74) *Attorney, Agent, or Firm* — FisherBroyles, LLP

(57) ABSTRACT

A system and method embodying the invention utilizes voice applications that are performed by voice applications agents resident on user local devices to deliver messages to the users. The voice applications can also be used to collect information from the users. Also, voice applications can be used to allow users to purchase goods and services. Voice applications for these purposes could be customized to take into account the individual characteristics of the users.

19 Claims, 7 Drawing Sheets

(56) References Cited

U.S. PATENT DOCUMENTS

| | | | |
|---|---|---|---|
| 7,020,609 B2 | 3/2006 | Thrift et al. | |
| 7,062,709 B2 | 6/2006 | Cheung | |
| 7,174,005 B1* | 2/2007 | Rodkey et al. | 379/88.12 |
| 7,263,712 B2* | 8/2007 | Spencer | H04N 7/163 |
| | | | 348/E7.061 |
| 7,809,376 B2* | 10/2010 | Letourneau et al. | 455/445 |
| 7,844,215 B2* | 11/2010 | Vance et al. | 455/3.06 |
| 8,483,853 B1* | 7/2013 | Lambourne | H04R 3/12 |
| | | | 381/107 |
| 2002/0001370 A1 | 1/2002 | Walker et al. | |
| 2002/0022453 A1* | 2/2002 | Balog | H04W 40/02 |
| | | | 455/41.2 |
| 2002/0059073 A1 | 5/2002 | Zondervan et al. | |
| 2002/0108125 A1* | 8/2002 | Joao | H04N 21/812 |
| | | | 725/139 |
| 2002/0169604 A1 | 11/2002 | Damiba et al. | |
| 2002/0188451 A1 | 12/2002 | Guerra et al. | |
| 2003/0007609 A1 | 1/2003 | Yuen et al. | |
| 2003/0068999 A1 | 4/2003 | Casali et al. | |
| 2003/0144005 A1 | 7/2003 | Videtich | |
| 2003/0233238 A1 | 12/2003 | Creamer et al. | |
| 2004/0006471 A1 | 1/2004 | Chiu | |
| 2004/0010412 A1 | 1/2004 | Chiu | |
| 2004/0068364 A1 | 4/2004 | Zhao et al. | |
| 2004/0093218 A1* | 5/2004 | Bezar | G10L 17/26 |
| | | | 704/273 |
| 2004/0151285 A1 | 8/2004 | Sychta | |
| 2004/0163073 A1 | 8/2004 | Krzyzanowski et al. | |
| 2004/0230689 A1 | 11/2004 | Loveland | |
| 2005/0091057 A1 | 4/2005 | Phillips et al. | |
| 2005/0135338 A1 | 6/2005 | Chiu et al. | |
| 2005/0141679 A1 | 6/2005 | Zirngibl et al. | |
| 2005/0163136 A1 | 7/2005 | Chiu et al. | |
| 2005/0234720 A1 | 10/2005 | Paillet et al. | |
| 2005/0283367 A1 | 12/2005 | Ativanichayaphong et al. | |
| 2006/0047511 A1 | 3/2006 | Hussain | |
| 2006/0069701 A1 | 3/2006 | O'Rourke, III | |
| 2006/0122840 A1 | 6/2006 | Anderson et al. | |
| 2006/0293897 A1 | 12/2006 | White et al. | |
| 2007/0143113 A1 | 6/2007 | Nanavati et al. | |
| 2010/0036717 A1* | 2/2010 | Trest | 705/14.1 |

OTHER PUBLICATIONS

U.S. Appl. No. 12/717,881, filed Mar. 4, 2010.
U.S. Appl. No. 12/717,888, filed Mar. 4, 2010.
U.S. Appl. No. 12/717,875, filed Mar. 4, 2010.
U.S. Appl. No. 12/717,858, filed Mar. 4, 2010.
U.S. Appl. No. 12/717,854, filed Mar. 4, 2010.
U.S. Appl. No. 12/717,839, filed Mar. 4, 2010.
U.S. Appl. No. 12/717,826, filed Mar. 4, 2010.
U.S. Appl. No. 12/717,897, filed Mar. 4, 2010.
U.S. Appl. No. 11/514,116, filed Sep. 1, 2006.
Office Action dated Feb. 26, 2010 in U.S. Appl. No. 11/514,116.

* cited by examiner

SYSTEM AND METHOD FOR PROVIDING INTERACTIVE SERVICES

This application claims priority to the filing date of U.S. Provisional Application No. 61/157,314, which was filed on Mar. 4, 2009, the contents of which are hereby incorporated by reference. This application is also a continuation-in-part of U.S. application Ser. No. 11/514,116, which was filed on Sep. 1, 2006, now abandoned which itself claims priority to the filing date of U.S. Provisional Application No. 60/712,808, which was filed on Sep. 1, 2005, the contents of both of which are hereby incorporated by reference.

FIELD OF THE INVENTION

The invention relates to systems and methods which allow multiple individual users to rapidly, easily and inexpensively communicate with a single core entity, and which likewise allow the core entity to rapidly, easily and inexpensively communicate with multiple individual users.

BACKGROUND OF THE INVENTION

There are various existing computer and telephony systems that provide voice services to users. These voice services can be speech recognition and touchtone enabled. Examples of such services include voice mail, voice activated dialing, customer care services, and the provision of access to Internet content via telephone.

One common example of a system that provides voice services is an Interactive Voice Response (IVR) system. In prior art systems, a user would typically use a telephone to call in to a central computer system which provides voice services via an IVR system. The IVR system deployed on the central computer system would then launch voice services, for instance by playing an audio clip containing a menu of choices to the user via the telephone line connection. The user could then make a selection by speaking a response. The spoken response would be received at the central computer system via the telephone line connection, and the central computer system would interpret the spoken response using speech recognition techniques. Based on the user's response, the IVR system would then continue to perform application logic to take further action. The further action could involve playing another menu of choices to the user over the telephone line, obtaining and playing information to the user, connecting the user to a third party or a live operator, or any of a wide range of other actions.

The ability to provide voice services has been quite limited by the nature of the systems that provide such services. In the known systems that provide voice services using relatively complex speech recognition processing, the voice applications are performed on high end computing devices located at a central location. Voice Application processing requires a high end centralized computer system because these systems are provisioned to support many simultaneous users.

Because complex voice application processing must be provided using a high end computer system at a central location, and because users are almost never co-located with the high end computer system, a user is almost always connected to the central computer system via a telephone call. The call could be made using a typical telephone or cell phone over the PSTN, or the call might be placed via a VoIP-type (Skype, SIP) connection. Regardless, the user must establish a dedicated, persistent voice connection to the central computer system to access the voice services.

FIG. 1 depicts a typical prior art architecture for a centralized voice services platform. In this type of system, the speech recognition functions are performed at a central computer system. As shown in FIG. 1, a user telephone 1010 is used to place a telephone call to a central voice services platform 1060 via a telephone network 1040. The telephone network 1040 could be a traditional PSTN, or a VoIP based system. Either way, the user would have to establish the telephone call to the central voice service platform 1060 via a telephone carrier.

The prior art centralized voice services platforms, which depend on a telephony infrastructure for connection to users, are highly inflexible from a deployment standpoint. The configurations of hardware and software are all concentrated on a small number of high end servers. These configurations are technically complex and hard to monitor, manage, and change as business conditions dictate. Furthermore, the deployment of existing IVR system architectures, and the subsequent provisioning of users and voice applications to them, requires extensive configuration management that is often performed manually. Also, changes in the configuration or deployment of IVR services within extant IVR architectures often require a full or partial suspension of service during any reconfiguration or deployment effort.

Further, cost structures and provisioning algorithms that provision the capabilities of such a centralized voice services platform make it virtually impossible to ensure that a caller can always access the system when the system is under heavy usage. If the system were configured with such a large number of telephone line ports that all potential callers would always be connected to access contrasting types of voice services, with different and overlapping peak utilization hours, the cost of maintaining all the hardware and software elements would be prohibitive. Instead, such centralized voice services platforms are configured with a reasonable number of telephone ports that result in a cost-effective operating structure. The operator of the system must accept that callers may sometimes be refused access. Also, system users must accept that they will not receive an "always on" service.

Prior art centralized voice services platforms also tend to be "operator-centric." In other words, multiple different service providers provide call-in voice services platforms, but each service provider usually maintains their own separate platform. If the user has called in to a first company's voice services platform, he would be unable to access the voice services of a second company's platform. In order to access the second company's voice services platform, the user must terminate his call to the first company, and then place a new call to the second company's platform. Thus, obtaining access to multiple different IVR systems offered by different companies is not convenient.

In addition to the above-described drawbacks of the current architecture, the shared nature of the servers in a centralized voice services platform limits the ability of the system to provide personalized voice applications to individual users. Similarly, the architecture of prior art IVR systems limit personalization even for groups of users. Because of these factors, the prior art systems have limitations on their ability to dynamically account for individual user preferences or dynamically personalize actual voice applications on the fly. This is so because it becomes very hard for a centralized system to correlate the user with their access devices and environment, to thereby optimize a voice application that is tuned specifically for an individual user. Further, most centralized systems simply lack user-specific data.

With the prior art voice services platforms, it was difficult to develop efficient mechanisms for billing the users. Typically, the telephone carrier employed by the user would bill the user for calls made to the voice services platform. The amount of the charges could be determined in many different ways. For instance, the telephone carrier could simply bill the user a flat rate for each call to the voice services platform. Alternatively, the telephone carrier could bill the user a per-minute charge for being connected to the voice services platform. In still other methods, the voice services platform could calculate user charges and then inform the carrier about how much to bill the user. Regardless of how the charges are calculated, it would still be necessary for the telephony carrier to perform the billing, collect the money, and then pay some amount to the voice service platform.

Prior art voice services platforms also had security issues. In many instances, it was difficult to verify the identity of a caller. If the voice services platform was configured to give the user confidential information, or the ability to transfer or spend money, security becomes an important consideration.

Typically, when a call is received at the voice services platform, the only information the voice services platform has about the call is a caller ID number. Unfortunately, the caller ID number can be falsified. Thus, even that small amount of information could not be used as a reliable means of identifying the caller. For these reasons, callers attempting to access sensitive information or services were usually asked to provide identifying data that could be compared to a database of security information. While this helps, it still does not guarantee that the caller is the intended user, since the identifying data could be provided by anybody.

Some prior art voice services platforms were used to send audio messages to users via their telephones. The central voice services platform would have a pre-recorded audio message that needed to be played to multiple users. The platform would call each of the users, and once connected to a user, would play the audio message. However, when it was necessary to contact large numbers of users, it could take a considerable amount of time to place all the calls. The number of simultaneous calls that can be placed by the centralized voice services platform is obviously limited by the number telephone ports it has. Further, in some instances, the PSTN was incapable of simultaneously connecting calls on all the available line ports connected to the voice services platform. In other words, the operators found that when they were trying to make a large number of outgoing calls on substantially all of their outgoing lines, the PSTN sometimes could not simultaneously connect all of the calls to the called parties. Further, when a voice services platform is delivering audio messages in this fashion, they tie up all the telephone port capacity, which prevents users from calling in to use the service.

One use of a voice services platform as discussed above relates to interacting with a television broadcast audience. In recent years, television programs have included various contests which allow members of the viewing audience to vote as part of the process of establishing a winner. In some instances, audience members located at home are capable of voting by calling pre-determined telephone numbers. Typically one number would be established for a yes vote and another number would be established for a no vote. If the audience was voting for one of multiple different contestants, each contestant might have a different pre-determined telephone number, and the viewing audience would be capable of voting by calling the telephone number for the contestant that they believed should win.

As mentioned above, the voice services platforms that would receive call-in votes for this sort of a television contest would need to be able to receive large numbers of telephone calls over a relatively short period of time. However, there are some serious limitations on the ability of such a system to receive and tabulate the votes of all audience members wishing to cast a vote. Such systems were limited by the number of telephone lines into the system, and the ability of the PSTN to connect incoming calls to all of those lines. As a result, in most instances, the systems are only able to receive and tabulate votes for a fraction of the total number of audience members wishing to vote.

Over the last few years, more and more individuals have acquired mobile telephones that have the ability to send text messages. The text messages are communicated exclusively in a digital data format, although they traverse the cellular telephone network. It is possible to process a much larger number of text messages than actual telephone call votes for the same period of time. Also, it is generally less expensive to process a text message, as opposed to a telephone call. As a result, the producers of some television programs asking for audience participation have begun to instruct the audience members to vote or provide input via text messages.

An example of such a system is illustrated in FIG. 2. As shown therein, multiple mobile telephones 1020 are connected to the cellular telephone network 1050 and are capable of sending text messages via the cellular telephone network. In some instances, the television program producers invite audience members to send a message to one telephone number 1060 for a yes vote and to another telephone number 1062 for a no vote. Alternatively, the program producers might use a single telephone number and actually examine the content of the text messages to determine how the audience members are voting.

The text messaging approach has the capability to allow more audience members to vote, but there are still problems. To begin with, the cellular telephone network also has hard limits to the number of text messages that can be handled in any given period of time. Due to internal system delays, some messages may not arrive before the program needs to tabulate and display the results of the voting. As a result, some, or possibly many audience members will think that they have cast a vote, even thought the text message with their vote arrives too late to be counted. In addition, depending on the service plan held by the individual audience members, the audience members may be charged for sending the text message.

Another approach to receiving audience participation involves having the audience members send an e-mail to a particular e-mail address, or having the audience members log onto a particular website to cast a vote. These methods also have drawbacks. First, many people do not have access to the Internet. For those that do, they may have their computer located in a room of their house that is separate from the room containing the television. As a result, it may be highly inconvenient for an audience member to go to his computer to cast a vote. Also, there are limits on the number of visitors that a website can receive on a simultaneous basis. If too many audience members try to log onto a website at the same time to cast a vote, it can result in the website crashing, which prevents anyone from voting.

DETAILED DESCRIPTION OF PREFERRED EMBODIMENTS

Figure 1:
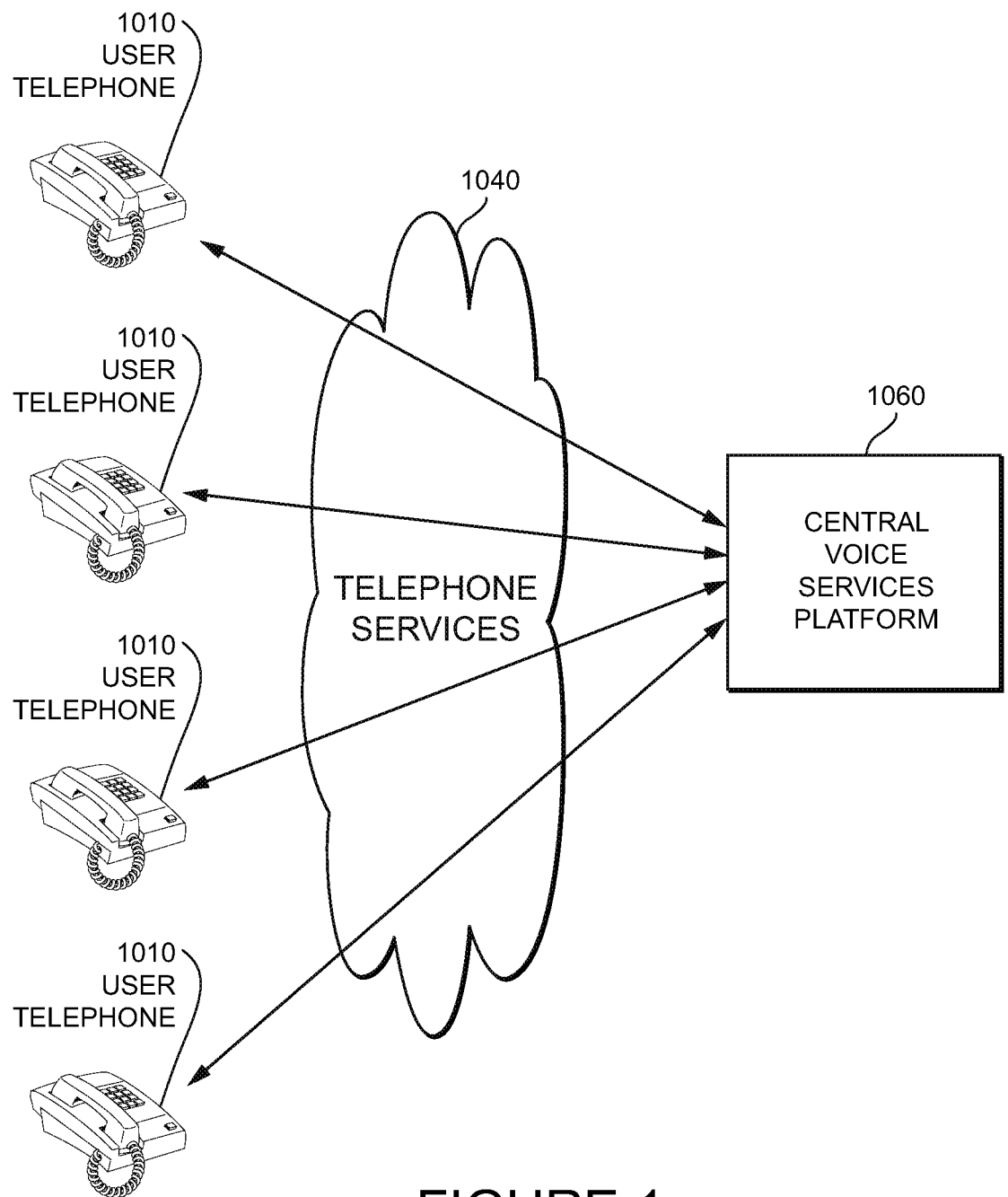
FIG. 1 illustrates elements of a traditional system used to provide users with voice based services.

The inventors have developed new systems and methods of delivering voice-based services to users which make use of some aspects of the basic architecture illustrated in FIG. 1. A full description of the systems and methods created by the inventors is provided in U.S. patent application Ser. No. 11/514,116, which was filed on Sep. 1, 2006.

The systems and methods created by the inventors are intended to provide users with speech and touch tone enabled Voice Applications for accessing various services and for performing various functions. In this respect, the systems, devices and methods embodying the invention serve some of the same functions as prior art centralized voice services platforms. The systems and methods can also be used to provide the same type of call forwarding discussed above, but at a lower cost, and with greater flexibility. In addition, the systems and methods created by the inventors make it possible to provide users with a whole host of additional call handling and call notification functions that would have been impossible with prior systems.

Unlike the prior art voice services platforms, systems and methods embodying the invention utilize a highly distributed processing architecture to deliver the services. As will be explained below, the underlying architecture and the distributed nature of systems and methods embodying the invention allow the inventive systems to provide the same services as the prior art systems, but with better performance, at a significantly reduced cost, and with far fewer limitations. In addition, systems and methods embodying the invention avoid or solve many of the drawbacks of the prior systems. Further, because of the way systems and methods embodying the invention operate, they can provide new and additional services that could never have been provided by the prior art systems. Systems and methods embodying the invention also allow for much better personalization of delivered services, and they allow existing services to be upgraded, improved, or further personalized much more easily than was possible with the prior art systems.

Systems and methods embodying the invention are intended to deliver or provide Voice Applications (hereinafter, "VAs") for a user. Before beginning a discussion of systems and methods that embody the invention, we should start by discussing what a VA is, and what a VA can do for a user. Unfortunately, this is somewhat difficult, because VAs can take a wide variety of different forms, and can accomplish a wide variety of different tasks.

A VA provides a user with the ability to use their natural voice, touch tone sequences or other forms of user input, to access and/or control an application, to obtain information, to perform a certain function, or to accomplish other tasks. Although the majority of the following description assumes that a user will interact with a system embodying the invention, at least in part, via speech, other forms of user interaction fall within the scope and spirit of the invention. For instance, developing technologies that allow a user to make selections from visual menus via hand or eye movements could also for the basis of a user interaction protocol. Likewise, developing technologies that are able to sense a user's brainwave patterns could form the basis of a user interaction protocol. Thus, systems and methods embodying the invention are not limited to speech-based user interfaces.

A VA could be specifically developed to utilize the benefits of speech recognition-based input processing. For instance, a VA could be developed to access, play and manipulate voice mail via speech commands. Alternatively, a VA could act as an extension or an enhancement of traditional GUI-like applications to allow the traditional applications to be accessed and/or controlled by speech commands. For instance, a VA could allow the user to call up specific e-mail messages on a display via spoken commands, and the user would then read the e-mail messages on the display.

In some instances, a VA could act like one of the interactive voice response systems that are accessible to users on prior art centralized voice services platforms. A VA could act in exactly the same way as a prior art IVR system to allow a user to obtain information or accomplish various functions using a speech enabled interface. However, because of the advantages of the new architecture, a system embodying the invention can perform voice applications that would have been impossible to perform on prior art centralized voice services platforms. Other VAs could perform a wide variety of other tasks. In most instances, the user would be able to accomplish functions or obtain information by simply speaking voice commands.

With the above general description of a Voice Application (VA) as background, we will now provide an overview of systems and methods embodying the invention. The following overview will make reference to FIG. 1, which depicts a high-level diagram of how a system embodying the invention would be organized.

Figure 3:
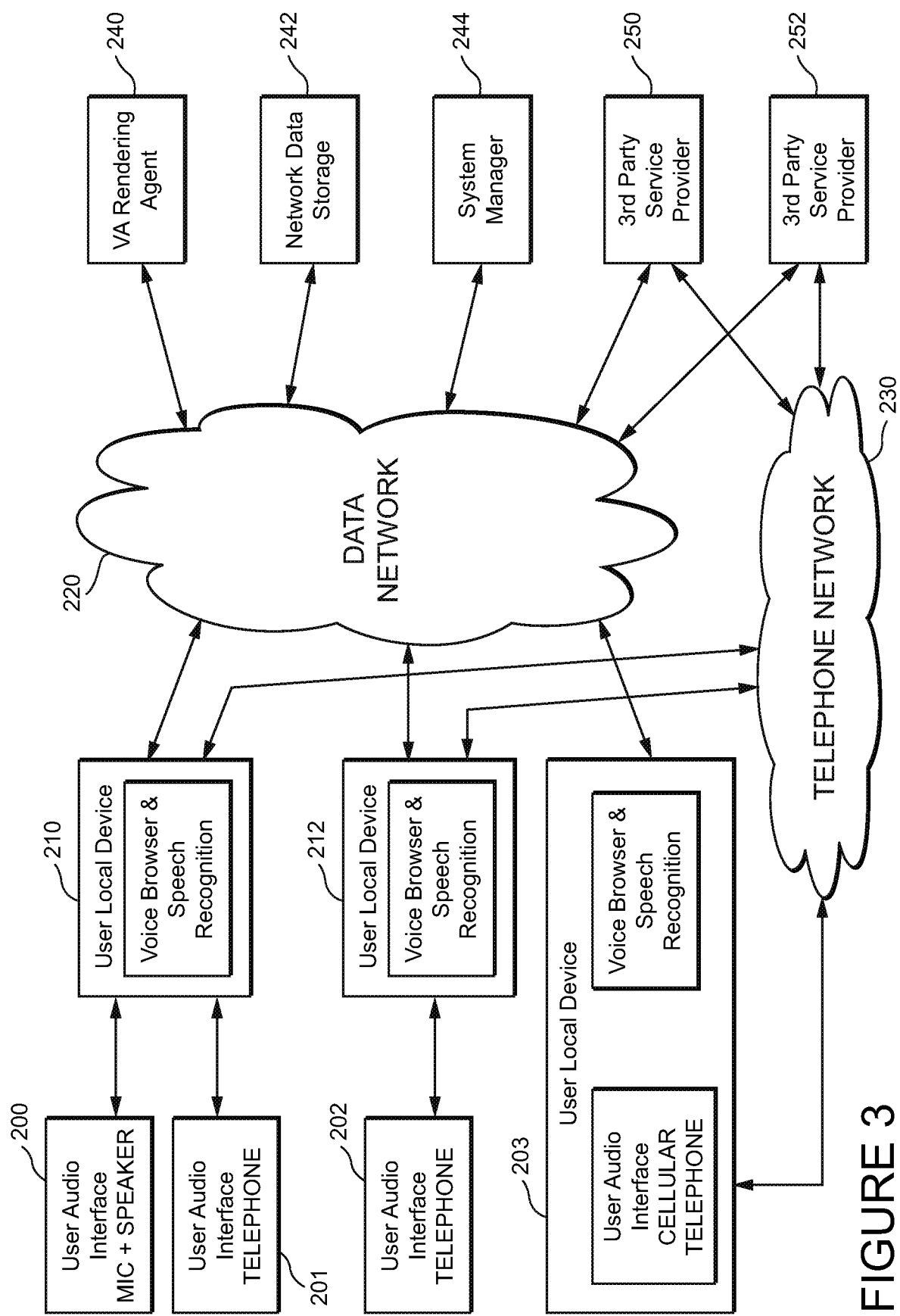
FIG. 3 illustrates elements of a system embodying the invention.

As shown in FIG. 3, preferred embodiments of the invention would make use of an optional telephone network 230 and a data network 220. The telephone network 230 could be a traditional PSTN, a VoIP system, a peer-to-peer telephone network, a cellular telephone network, or any other network that allows a user to place and receive telephone calls. The data network 220 could be the Internet, or possibly a private or internal local area network or intranet.

In some instances, users would only be physically coupled to a data network, such as the Internet. In this case, the user's on-site equipment could enable them to place VoIP telephone calls via the data network. Such VoIP telephone calls might make use of the PSTN, or the entire call might be handled over the data network. Regardless, in preferred embodiments, the user would be capable of simultaneously maintaining a telephone connection and sending and receiving data.

Systems embodying the invention, as shown in FIG. 3, will be referred to as having a Distributed Voice Application Execution System Architecture (hereinafter, a "DVAESA"). Thus, the term DVAESA refers to a system and method of providing voice application services in a distributed fashion, over a network, to a customer device. Such a system is closely managed by a centralized system to, among other things, ensure optimum performance, availability and usability. In some of the descriptions which follow, there are references to "DVAES-enabled" equipment or local devices/device. This means equipment and/or software which is configured to act as a component of a DVAESA embodying the invention.

A user would utilize an audio interface device to access the DVEASA. In the embodiment shown in FIG. 3, a first user's audio interface 200 comprises a microphone and speaker. A second user audio interface 201 comprises a telephone. The telephone 201 is also connected to the same user local device 210 as the first user audio interface. A third user's audio interface 202 could also comprise a telephone. This telephone 202 could be a regular wired telephone, a wireless telephone or even a cellular telephone. The DVAES-enabled devices may support multiple audio interface devices, and the multiple devices could all be of the same type, or multiple different types of user audio interfaces could all be connected to the same local device.

Each user would also make use of a local DVAES-enabled device that would act to deliver or provide VAs to the user through the user's audio interface. The local DVAES-enabled devices would include a voice browser capable of performing voice applications that have been distributed over the network, some of which may have speech recognition functions. Such voice applications could be pre-delivered to the local DVAES-enabled device, or the voice applications could be fetched in real time. Such voice applications are personalized to the user and optimized for the device. In the embodiment shown in FIG. 3, each of the user local devices 210, 212, 203 are coupled to the respective user audio interfaces, and to the data network.

In some embodiments of the invention, a user audio device and a DVAES-enabled device could be integrated into a single electronic device. For instance, a PDA with cell phone capability could also incorporate all of the hardware and software elements necessary for the device to also act as the DVAES-enabled equipment. Thus, a single user device could function as both the DVAES-enabled equipment that communicates with the network, and as the user audio interface. The user local device 203 shown in FIG. 3 is intended to illustrate this sort of an embodiment.

Also, in FIG. 3, various lines connect each of the individual elements. These lines are only intended to represent a functional connection between the two devices. These lines could represent hard-wired connections, wireless connections, infrared communications, or any other communications medium that allows the devices to interact. In some instances the connections could be continuous, and in others the connection could be intermittent. For instance, an audio interface and a user local device could be located within a user's vehicle. In such a case, the local device within the vehicle might only be connected to the network through a cellular telephone network or through another type of wireless network when such connectivity is required to provide a user with services. In a similar embodiment, the local device in the user's vehicle might only link up to the network when the vehicle is parked at the user's home, or some other location, where a wireless connection can be implemented.

Also, the user audio interface 202 shown in FIG. 3 could be a cell phone that is capable of interacting with the normal cellular telephone network. However, the cellular telephone might also be capable of interacting with the user local device 212 via a wired or wireless connection. Further, the cellular telephone 202 might be configured such that it acts like a regular cellular telephone when the user is away from home (and is not connected to the local device 212). But the cellular telephone might switch to a different operating mode when it is connected to the local device 212 (when the user is at home), such that all incoming calls to that cell phone are initially received and processed by the local device 212. The DVAESA also would include some network-based elements. As shown in FIG. 3, the network-based elements could include a VA rendering agent 240, a network storage device 242 and a system manager 244. Each of these network-based elements would be connected to the data network.

Also, although they would not technically be considered a part of the DVAESA, there might also be some third party service providers 250, 252 which are also connected to the data network, and/or to the telephone network. As explained below, the VAs may enable the users to interact with such third party service providers via the data and telephone networks.

When a DVAESA as shown in FIG. 3 is configured, VAs would be "rendered" by the VA rendering agent 240, the output of the rendering process would be rendered VAs. These rendered VAs may be stored on the Network Storage Device 242, or be distributed or delivered to a DVAES-enabled Device. "Rendering" refers to a process in which a generic VA is personalized for a particular user and/or one or more particular DVAES-Devices to generate Rendered VAs. The system manager 244 could instruct the VA rendering agent 240 to render a VA for a particular user, or such rendering request could originate from the DVAES-enabled Device. The DVAESA network data storage element 242 could be used to store generic VA, rendered VAs, or a wide variety of other data and resources (e.g. audio files, grammars etc).

As mentioned above, the VA rendering agent would personalize a generic VA during the rendering process. This could take into account personal traits of the individual user, information about the configuration of the local device(s), or a wide variety of other things, as will be explained in more detail below. The information used to personalize a VA during the rendering process could be provided to the VA rendering agent at the time it is instructed to render the VA, or the VA rendering agent could access the information from various data storage locations available via the data network.

The user's local devices would typically be inexpensive computing devices that are capable of running a voice browser and performing speech recognition capable rendered VAs. Such devices are often referred to as embedded multimedia terminal adaptors (EMTAs) and optical embedded multimedia terminal adaptors (OEMTAs). In many instances, the local device would be physically present at the user's location, such as a home or office. In other instances, however, the local device could be a virtual device that is capable of interacting with one or more user audio interfaces. As mentioned above, the local devices may also store rendered VAs, and then act to perform the rendered VAs to the user's audio interface. The user local device could be a customer premise device that is also used for some other function. For instance, the local device could be a cable modem or set-top box that is also used to connect a television to a cable network, however, the device would also be configured to perform VAs for the user via the user's audio interface.

In one simple embodiment of the invention, a local embedded device 212 would be linked to a user's telephone 202. The local device 212 would also be linked to the Internet 220 via a medium to high speed connection, and possibly to the telephone network 230. The user could speak commands into the telephone 202, and those spoken commands would be processed by the local device 212 to determine what the user is requesting.

The processing and interpretation of a user's spoken commands could be entirely accomplished on the local device 212. In other embodiments, the local device might need to consult a speech recognition engine on a remote device, via the data network, to properly interpret a portion of a spoken command that cannot be understood or interpreted by the local device. In still other embodiments, the user's spoken commands could be entirely processed and interpreted by a remote speech recognition engine. For instance, a recording of the user's spoken commands could be relayed to a remote speech recognition engine, and the speech recognition engine would then process the spoken commands and send data back the local device indicating what the user is commanding. Even this process could be accomplished in real time such that the user is unaware that the interpretation of his spoken commands is being accomplished on a remote device. Because of the greater sophistication that is possible with a system embodying the invention, if the local device does not understand something, it can often ask another question of the user to clarify the situation. In addition, the local device can offer greatly expanded vocabulary and speech processing by enlisting the assistance of network agents. For all these reasons, a consumer electronic device that is coupled into the DVAES architecture can provide a much more sophisticated voice application than prior art devices which were not connected to a network.

Once the spoken command has been interpreted, in some instances, the local device 212 may be able to satisfy the user's request. In other instances, the local device 212 might need to request information from a VA Rendering Agent 240 to satisfy the user's request. If that is the case, the local device 212 would send a query over the data network 220 to the VA Rendering Agent 240 for some type of content. The requested content would be returned to the local device 212, and the local device 212 would then provide the content to the user via the user's telephone 202. In other instances, the local device may be able to query other network-connected elements which are not a part of the DVAES Architecture, and those other elements would return the requested data to the local device so that the data could be delivered to the user via the audio interface.

Depending on the VA being performed, the functions that are performed in response to a user request may not involve playing audio information to the user via the user's audio interface. For instance, the local device could be performing a VA relating to accessing e-mail. In this instance, a user's spoken request could cause the local device to act in a manner that ultimately results in the user's e-mail messages being shown on a display screen. In this instance, although the user makes use of a speech-based interface to obtain information and/or perform a certain function, the ultimate result is not the playback of audio, but rather display of an e-mail message.

The end result of a user request could take many other forms, such as the local device causing a certain action to be taken. For instance, the user might speak a request that causes the user's home air conditioning system to be turned on. The list of possible actions that could be enabled by the local device is virtually endless. But the point is that the local device is able to provide a speech-enabled interface to the user, via the audio interface, to allow the user to accomplish a task.

In another simple embodiment, the user might pick up his telephone 202 and speak a request to be connected to another person's telephone. A voice application performed on the local device would interpret the user's spoken request. This could be done on the local device, or the voice application could utilize remote assets to accomplish the speech recognition. Some or all of the speech recognition could occur on the remote assets. The voice application would then take steps to place a telephone call to the person identified by the user. This might involve connecting the user via the telephone network 230, or connecting the user to the requested party via a VoIP call placed over the data network 220.

It is also worth noting that when a user is connected to the DVAES architecture, the VAs provided by the system can completely replace the dial tone that people have come to associate with their telephones. The moment that a user picks up his telephone, he will be launched directly into a voice application that is provided by the system. In the past, this may have been technically possible, but it was always accomplished by making use of the traditional phone system. For instance, one of the prior art centralized voice services platforms would have been capable of ensuring that the moment a user lifts his telephone, that user was immediately connected to a central voice services platform that would guide the remainder of the user's experience. But this was always accomplished by establishing an immediate voice channel between the user's telephone and the central voice services platform. And to accomplish that, it was necessary to involve the telephone carrier that would link the user's telephone to the voice services platform. In contrast, with the DVAES architecture, one no longer needs to make any use of the telephone carriers to provide this sort of a service. And, as noted above, the user can still be easily connected to the regular telephone network if he needs to place a call.

In the same vein, in the past, whenever a user wanted to have a third party service answer his telephone calls, as in traditional voice mail systems, it was necessary to involve the carrier in routing such calls to a third party service. Now, when a call is made to the user's telephone, the DVAES architecture makes it possible to answer the call, and take voice mail recordings, without any further involvement of the carrier. Here again, the DVAES architecture makes it possible to eliminate the services of the telephone carrier.

In both the examples outlined above, the involvement of the carrier necessarily increased the cost of providing the voice services. Because the carrier can be eliminated, the same sorts of voice services can be provided to a user for a significantly reduced cost. And, as explained below, the services can be delivered with greater performance and with new and better features.

In some embodiments, rendered Voice Application processing is performed on the local device and the associated the voice recognition functions may also be performed on the local device. For this reason, there is no need to establish a dedicated duplex audio link with a remote high end computer. Also, even in those instances where a portion of the voice application processing is performed by a remote device, and/or where processing and interpretation of spoken commands is processed by a remote device, the communications necessary to accomplish these actions can be made via data packets that traverse a data network. Thus, here again, there is no need to establish a dedicated duplex audio link with a remote high end computer to provide the requested services.

Also, because the local embedded device is coupled to a data network such as the Internet, it can rapidly obtain Rendered Voice Applications and associated data from various remote sources in order to satisfy user requests. For these reasons, the simple embedded local device allows one to provide the user with speech recognition enabled Voice Applications without the need to create and maintain a high end speech service platform with multiple telephone line access equipment.

As noted above, the local device could also use the network to obtain access to various other physical elements to effect certain physical actions, such as with the home air conditioner example given above. In this context, the other physical elements could be connected to the network, or the local device could have a local connection to physical elements that are also located on the user's premises. For instance, the local device could have a hard-wired or wireless connection to many different elements in a user's home or office that allow the local device to control operations of the physical elements. In other embodiments, the piece of physical equipment could act as the local device itself.

One obvious advantage of a DVAESA over prior art voice service platforms is that a DVAESA embodying the invention can provide VAs to users without any involvement of a PSTN, VoIP, Peer-Peer carrier. The instant the user picks up his telephone handset, he will be interacting with the DVAESA, not the telephone system. A large number of VAs could be accomplished without ever involving a telephone carrier as the Voice Application is delivered and provided on the local device. Because the user can directly access the DVAESA without making a telephone call, the operator of the DVAESA will not need to pay a telephone carrier in order to provide the service to users.

As noted above, if the user wishes to place a telephone call, this can be easily accomplished. But there is no need to use a telephone carrier as an intermediary between the user and the DVAESA. This has multiple positive benefits.

Also, for a multitude of different reasons, a DVAESA will be less expensive to deploy and operate than the prior art central voice services platforms. To begin with, because the DVAESA can provide services to users without a telephone link, the DVEASA operator no longer need to purchase and maintain multiple telephone line ports into the system.

Also, the types of equipment used by the DVAESA are inherently less expensive to deploy and manage than the equipment used in a central voice services platform. A DVAESA embodying the invention uses relatively inexpensive network appliances that can be located anywhere, and that can be deliberately distributed over a wide area to enhance reliability of the system. In contrast, a central voice services platform requires expensive and specialized telecom equipment like telecom switches and IVR servers. The central voice services platforms also require more intensive management and provisioning than a DVAESA, and this management must be provided by highly skilled personnel as most of the equipment used is highly proprietary in nature. In contrast, the DVAESA is largely managed by an automated management system.

A prior art central voice services platform is only able to simultaneously service a limited number of users As noted above, in the prior art central voice services platforms, a dedicated voice link, via a telephone call, is maintained for each connected user. Once all lines are connected to users, no additional users are able to access the system. Hence the maximum number of simultaneous users that can be supported at any given time is equal to the lesser of the number of access lines or the number of associated telephony/IVR ports an operator maintains.

In contrast, a DVAESA embodying the invention has a very high limit on the number of users that can be simultaneously serviced. In a DVAESA embodying the invention, the moment a customer picks up his telephone he will be connected to the system. Thus, a DVAESA embodying the invention is "always on." Also, much of the interactions between the user and the system are handled directly by the local device on the customer premises. If the local device cannot immediately service a user request, and additional information is needed, the local device may make a synchronous or asynchronous request over the Internet. Typically, the information will be quite rapidly returned and played to the user. Thus, even if there is a small delay, the user is nevertheless still connected the voice services system.

With the DVAESA model, the same number of server assets can handle data requests from a much larger number of users as compared to the prior art central voice services platform. This is also another reason why a DVAESA is less expensive to deploy and maintain than a prior art central voice services platform.

In addition to being easier and less expensive to deploy and maintain, a DVAESA embodying the invention can also scale up much more quickly and at a lower cost as new users are added to the system. To begin with, because the DVAESA does not require dedicated telephone lines to operate, there is no cost associated with adding additional telephone ports to the system to accommodate additional users. Likewise, as new users are added, there are no new additional telecommunications expenses for more connect time or access. In addition, for the reasons noted above, the equipment used by the system is far less expensive than the equipment used in a central voice services platform to service the same number of users. Thus, adding any new equipment and users is less expensive for a DVAESA. Moreover, because it requires less equipment to service the same number of users in a DVAESA, there is much less equipment to purchase and maintain for each additional 1000 users.

A DVAESA embodying the invention is inherently more reliable than a prior art central voice services platform. Because the assets of a prior art system are typically located in a few physical locations, and are tied to physical phone lines, power outages and other physical problems are more likely to prevent users from being able to use the system. In contrast, a DVAESA can have its equipment distributed over a much wider area to reduce these problems. The points of a failure of a DVAESA can be highly localized and it is very cost effective to replicate DVAESA equipment.

Moreover, the underlying nature of the DVAESA makes it easy to connect multiple redundant servers to the network, so than in the event one or more assets fail, redundant assets can step in to take over the functions of the failed equipment. This was difficult to do in prior art central voice services platforms, and even when it was possible to provide redundant capabilities, the cost of providing the redundant equipment was much higher than with a DVAESA.

In addition, a prior art central voice service platform needs a telephone carrier to provide access to the users. If the telephone carrier has a service outage, the prior art system cannot function. In contrast, a DVAESA does not have any reliance on a telephone carrier.

The only network required to provide the DVAESA is the data network like the Internet. The user in most cases will not experience an interruption to access to the voice services of a DVAESA, even if there is an outage that disables the local device's access to the Internet. The local device could potentially perform some of the applications without connecting to the network. This indicates that for some Voice Applications in the DVAESA, it may be sufficient for the local device to have intermittent access to the Internet.

The architecture of a DVAESA makes it inherently able to deliver certain types of VAs with vastly improved performance. To use one concrete example, as noted above, when a central voice services application is attempting to deliver the same audio message to large number of users, the central voice services application must place a telephone call to each user, using a dedicated phone line, and deliver the message. Because the central voice services platform only has a limited number of outgoing lines, it can take a significant amount of time to place all those calls.

In contrast, in a DVAESA embodying the invention, it is not necessary to place any telephone calls to deliver the audio message to users. Instead, a server which is part of the system can push instructions to play the audio message, and the message itself (the message could be stored in advance of when the event to deliver the message occurs), to each of the local devices, and the local devices can then play the messages for each individual user. In variations on this theme, the server might only send the instruction to play the message, along with a reference to where a copy of the audio message is stored. Each local device could then download a copy of the message from the indicated location and play it for the user. Regardless, it would be possible for the DVAESA architecture to deliver the audio message to all the users in a small fraction of the time that it would take the prior art central voice services platform to accomplish the job.

Moreover, as also explained above, while the prior art central voice services platform is making calls to deliver audio messages to a plurality of users, it is tying up it's phone lines, and thus it's capacity to allow users to call in for services. In contrast, when a DVAESA is delivering audio messages to a plurality of users, the users are still able to access their voice services for other purposes.

A DVAESA embodying the invention also makes it possible to deliver many new voice applications and services that could never have been provided by the prior art central voice services platform. In most cases, it is the underlying differences in the architecture of a DVAESA embodying the invention, as compared to the prior art voice services platforms, which make these new services possible.

For example, a user could configure a voice application to run constantly in the background on a local device, and then take a certain action upon the occurrence of a specified event. So, for instance, the user could set up a voice application to break into an existing telephone conversation to notify him if a particular stock's trading price crosses a threshold. In this scenario, the voice application would periodically check the stock price. If the threshold is crossed, the voice application could cause any existing telephone call that the user is on to be temporarily suspended, and the voice application would then play the notification. The voice application could then return the caller to his call. This sort of a voice application would also be very complicated to provide under the prior art central voice services platform.

The graceful integration of advertising messages is another example of how a DVAESA embodying the invention can provide services that were impossible to provide with prior art central voice service platforms. As an example, if the user lifted the telephone and spoke a command that asked for options about ordering a pizza, the system could respond with a prompt that said, "to be connected to Pizza Shop A, say one; to be connected to Pizza Shop B, say two. By the way, Pizza Shop A is having a two for one special today." Thus, the advertising message could be gracefully incorporated into the played response. Also, the advertising message would be highly context relevant, which would make it more interesting to advertisers. Thus, advertising revenue could be collected by the operator of the DVAESA system.

A DVAESA embodying the invention could also be used to rapidly collect data from a very large number of users in ways that would have been impossible with prior art central voice services platforms. In this example, assume that a television program is currently airing, and during the program, viewers are invited to vote on a particular issue. In prior art systems, the users would typically place a telephone call to a central voice services platform and make a voice vote. However, as noted earlier, prior art voice services platforms are only able to talk to a limited number of callers at the same time because the callers must be connected by dedicated phone lines.

In a DVAESA embodying the invention, the user might be able to pick up the phone and say, "I want to vote on issue X." The system would already know that viewers of a television program had been invited to place a vote, so the system could immediately take the user's voice vote. The system could also tabulate the votes from all users making similar voice votes, and then provide the voting results to the television show producers in real time. Because so little actual information is being exchanged, and the exchanges are made over the Internet, thousands, and perhaps even millions of votes could be received and tabulated in a very short period of time. This would have been impossible with prior art central voice services platforms. Furthermore, a DVAES can distribute a fully featured voice application that not only plays the message, but further solicits feedback from the user, optionally tailors the interaction with the user, and may record any user feedback or responses. Furthermore, if the producers of the television show were willing to pay a fee to the operator of the DVAESA, the system could be configured such that as soon as viewers are invited to cast a vote, and for the duration of the voting period, anytime that a user of the DVAESA picks up his telephone to access the system, the system would first respond with the question, "would you like to vote on issue X?" This would be yet another way to derive advertising or promotional revenue from the DVAESA.

There are countless other ways to exploit the architecture of a DVAESA embodying the invention to accomplish tasks and to perform VAs that would have been impossible using the prior art central voice services platforms. The above examples are merely illustrative.

A DVAESA embodying the invention also allows for much greater personalization of the voice applications themselves than was possible with prior art central voice services platforms. In addition, the architecture allows the users themselves to control many aspects of this personalization.

To begin with, as explained above, in a DVAESA a VA Rendering Agent is responsible for customizing voice applications, and then delivering the customized voice applications to the local devices at the customer sites. Thus, the basic architecture assumes that each user will receive and run personalized versions of voice applications. This difference alone makes it much, much easier to provide users with personalized voice applications than prior art central voice services platforms.

The VA Rendering Agent could personalize a voice application to take into account many different things. For instance, the VA Rendering Agent could access a database of user personal information to ensure that a VA takes into account things like the user's name, his sex, age, home city, language and a variety of other personal information. The VA Rendering Agent could also access information about the capabilities of the local device at the customer's location that will be providing the VA, and possibly also the type of audio interface that the user has connected to the local device. The VA Rendering Agent could then ensure that the customized version of the VA that is provided to the user's local device is able to seamlessly and efficiently run on the local hardware and software. The VA Rendering Agent could also take into account user preferences that the user himself has specified. For instance, the VA could be customized to play audio prompts with a certain type of voice specified by the user.

Another important way that VAs could be personalized is by having the DVAESA track how the user is interacting with the system. For Example if the user has a certain type of accent or has a certain pattern of use or has a certain type of background noise, the VA Rendering Agent could take these factors into account on an on going basis to ensure that the customized VAs that are sent to the user are tuned to the user. The system might also note that whenever a three choice menu is played to the user, the user always makes the third selection. In that case, the VA Rendering Agent might be directed to re-render the VA so that the VA presents the third option first, instead of last.

There are any number of other ways that VA's could be customized or personalized to take into account aspects of individual users. And these customizations are easily and automatically accomplished by configuring the VA Rendering Agents to automatically incorporate these personalizations when delivering VAs for users. Because the DVAESA is configured so that each individual user may have his own versions of VAs, preferably stored on his local devices cache, this personalization is not difficult to accomplish. Such personalizations are complimented by the continuous analytics process that is being performed on DVAESA data. This data is collected during the on going functioning of the system and is provided by all DVAESA components. After collection, the data is analyzed, and the results of the analysis are used to continuously tune and improve the functioning of the system on an individual user-by-user basis.

A DVAESA also allows for better, more direct billing for delivery or usage of services. Because there is no telephone company acting as an intermediary, the operator of a DVAESA can directly bill users for use of the system. Also, the way the system is configured, the user can select individual services, which are then provided to him by rendering a VA and loading it on the user's local equipment. Thus, the user can tailor his services to his liking, and the operator of the DVAESA has an easy time tracking what services the user has. For all these reasons, it is much easier to bill the user for use of the services.

Another benefit that flows from the DVAESA model is the ability of a user to access services provided from two different DVAESA operators on a single piece of local equipment. As will be explained in more detail below, a first DVAESA operator could load a first set of VAs onto the user's local equipment, and a second DVAESA operator could load a second set of VAs onto the same piece of operator equipment. For instance, the first DVAESA operator could be one that provides the user with services related to his business, and the second DVAESA operator could be one that provides the user with services relating to the user's personal life. There is no inherent conflict in both having two different sets of VAs loaded onto the local device. And each DVAESA operator can thereafter maintain and update their respective VAs. Likewise, the user can cause both sets of VAs to be loaded on a first device at his office, and a second device at his home. This allows the user to easily and immediately access services from either operator, regardless of his present location. This sort of flexibility would also have been completely impossible in prior art central voice services platforms.

A DVAESA can also provide enhanced security measures compared to prior art central voice services platforms. For instance, because the DVAESA is interacting with the user via spoken commands, it would be possible to verify the identity of a user via a voice print comparison.

In addition, the individual local devices can be identified with unique ID numbers, and credentials verifying the identity and permissions of users and devices can all be created and stored in various locations on the system. By using these unique identification numbers and certification files, one can ensure that only authorized users can access sensitive information or perform sensitive functions.

Figure 2:
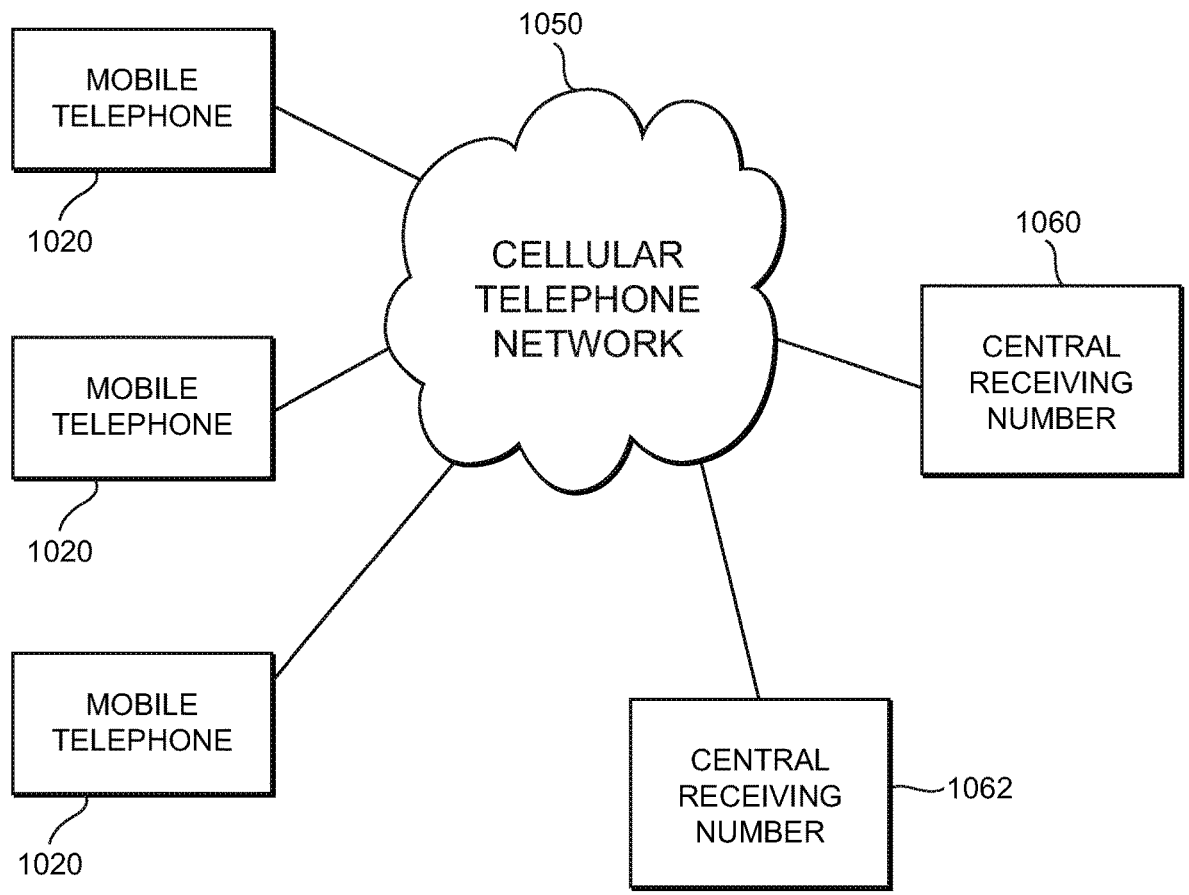
FIG. 2 illustrates elements of a traditional system used to receive and tabulate votes sent via text messages.

Having now provided a broad overview of the how a system embodying the invention would operate, and the inherent advantages of a DVAESA system as compared to prior art systems, we will now turn to a slightly more specific description of the main elements of a DVAESA embodying the invention, with reference to FIG. 2. In doing so, we will introduce some new definitions and terminology which will be used throughout the remainder of the detailed description.

A DVAESA would be configured to deploy and utilize one or more Voice Application Agents (hereinafter "VAAs") which themselves enable the delivery or performance of a VA through a local device that would typically be located in a user's home or office. In some instances, a VAA may be wholly resident on a single local device. In other instances, the functions of a VAA may be split between multiple portions of the overall system. Likewise, a single local device may only host one VAA. Alternatively, a single local device may host multiple VAAs. These variations, and the flexibility they provide, will be discussed in more detail below. The important concept is that a VAA is the agent that is responsible for delivering or performing a VA for the user.

Figure 4:
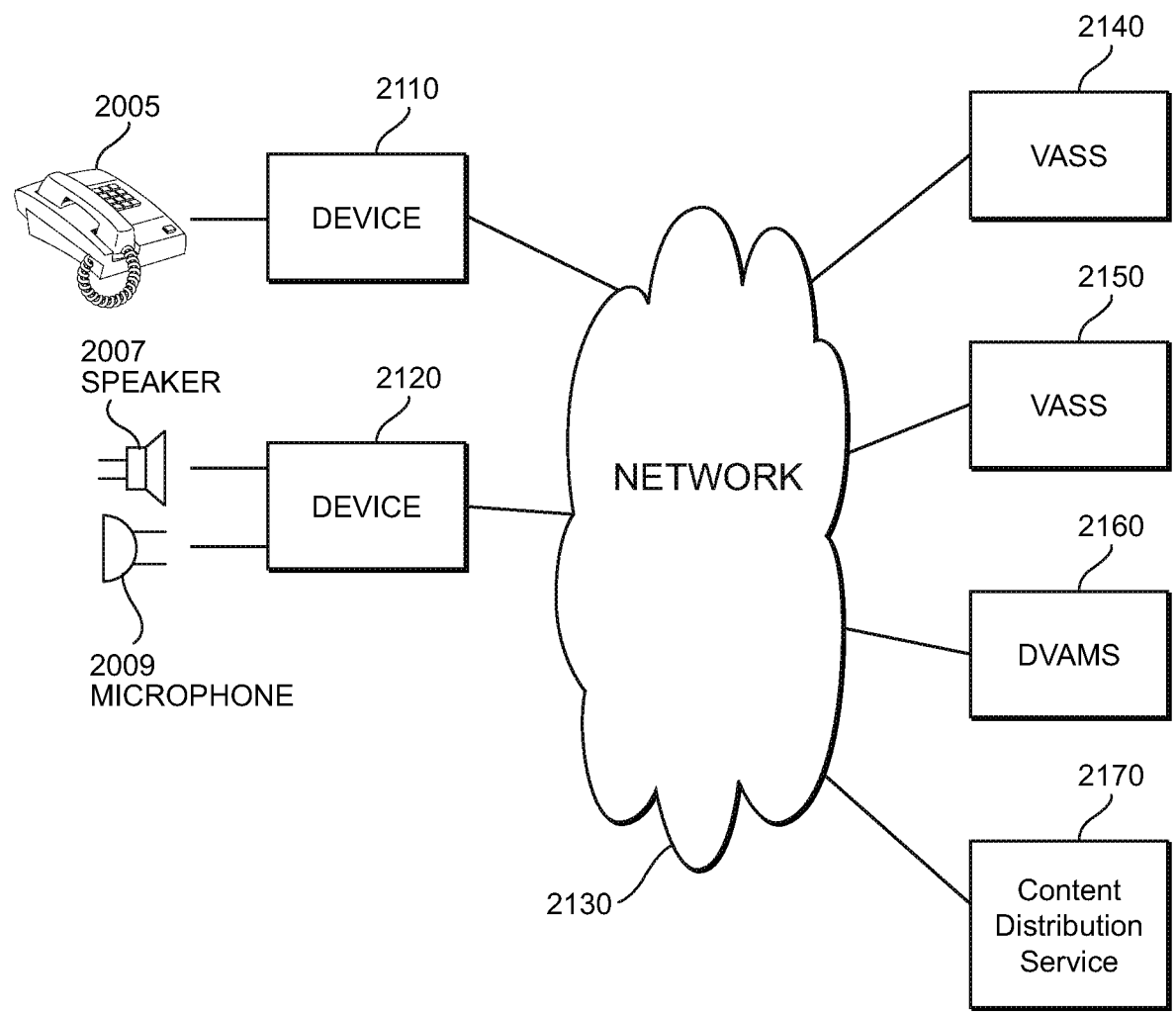
FIG. 4 illustrates elements of another system embodying the invention.

The network 2130 shown in FIG. 4 could be the Internet. However, in some instances, the network 2130 could be a public or private local network, a WAN, or a Local Area Network. In most instances, however, the network 2130 will be the Internet. Also, the network 2130 could also comprise portions of the PSTN, existing cellular telephone networks, cable television networks, satellite networks, or any other system that allows data to be communicated between connected assets.

The devices 2110 and 2120 appearing in FIG. 4 would be the local embedded devices that are typically located at a user's home or office. As shown in FIG. 4, in some instances, a local device 2110 could simply be connected to the user's existing telephone. In other instances, the local device could be coupled to a speaker 2007 and microphone 2009 so that the local device can play audio to the user, and receive spoken commands from the user. In still other embodiments, the local device may be a standalone telephone, or be included as part of a cellular telephone, a computing device with wireless access, a PDA that incorporates a cellular telephone, or some other type of mobile device that has access to a data network.

A system embodying the invention also includes components that deliver voice applications, data and other forms of content to the local devices. These components could include one or more Voice Application Services Systems (hereinafter VASSs). In the system depicted in FIG. 4, there are two VASSs 2140 and 2150. A system embodying the invention could have only a single VASS, or could have multiple VASSs.

One of the primary functions of a VASS is to render VAs and to then provide VA components to VAAs. In preferred embodiments, a VASS would provide customized VAs components to VAAs, upon demand, so that the VAAs can perform the customized VAs components for the user. The VASSs could personalize generic VAs based on known individual user characteristics, characteristics of the environment in which the VA components will be performed, information about how a user has previously interacted with the system, and a wide variety factors. The distribution of the personalized VA components to the VAAs could also be accomplished in multiple different ways.

A system embodying the invention may also include one or more Content Distribution Services (hereinafter a "CDSs"). This is an optional component that basically serves as a data storage and content distribution facility. If a system embodying the invention includes one or more CDSs, the CDSs would typically provide network-based caching of content, such as VA components, configurations, DVAESA components, and other shared or frequently used content. The CDSs would be deployed throughout the network to help reduce network traffic latency, which becomes particularly noticeable in any speech interaction system.

The DVAESA components could broadly be identified as a Distributed Voice Application Execution System (hereinafter, a "DVAES"), and a Distributed Voice Application Management System (hereinafter, a "DVAMS") A DVAES comprises at least a VASS, one or more VAAs, and the underlying hardware and software platforms.

The system shown in FIG. 4 includes a DVAMS. The DVAMS handles a wide variety of management functions which include registering users, specific items of hardware and other DVAES components, directing the rendering, caching, distribution and updating of VAs components, organizing and optimizing the performance of system assets, and multiple other functions. The DVAMS may also include an interface that allows an individual user to customize how the system will interact with him, and what products and services the user wishes to use. The DVAMS would also provide an interface that allows system operators to manually control various aspects of the system.

A DVAESA embodying the invention could also be used in at least three different but related ways to accomplish functions similar to existing systems, but with greater functionality and at a lower cost. First, a DVAESA could be used to easily gather information, votes, opinions and other forms of information from a large number of users in a very short period of time. Second, a DVAESA could be used to easily and rapidly send a large number of audio messages to system users, and those messages could be carefully targeted to individual users. Third, a DVAESA could be used to largely eliminate the need for live operators of a telemarketing operation that receives calls from users wishing to purchase items. Each of these areas is discussed separately below.

As noted above, in most existing systems that are used to collect information of a time critical nature, such as votes that respond to an invitation to vote during a television broadcast, the users place votes by making a telephone call to a specific number or by sending a text message to a particular telephone number. This requires that users make use of the telephone system to place their votes, which can be relatively expensive. And, as also noted above, this places significant limits on the number of votes that can be received and tabulated in a short period of time. This type of a voting system also requires users to record and accurately reproduce the telephone numbers used to place votes.

Figure 5:
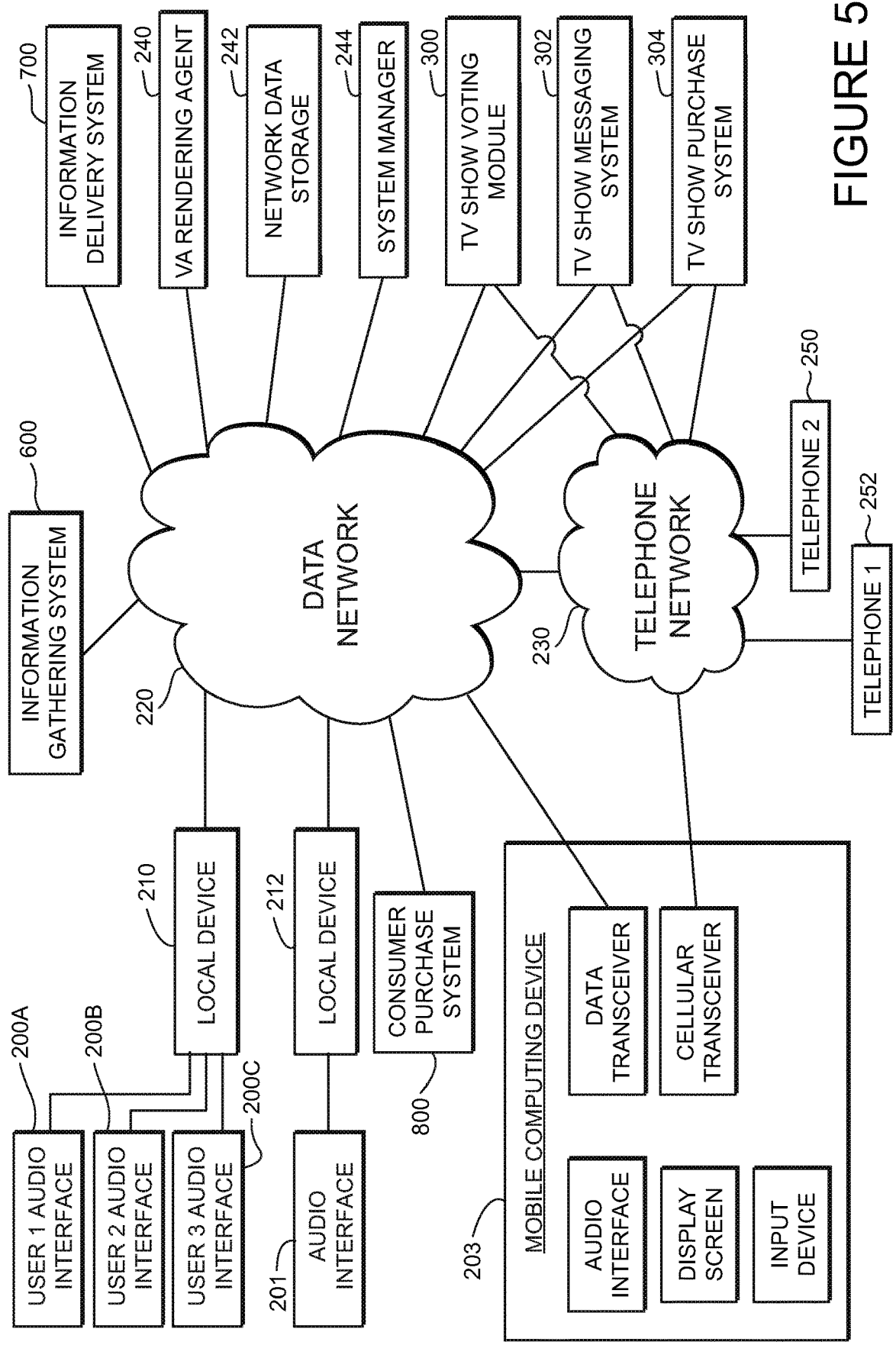
FIG. 5 illustrates elements of another system embodying the invention.

FIG. 5 illustrates an alternate system embodying the invention which can receive and tabulate audience votes for a television program while the program is being broadcast. As shown in FIG. 5, multiple local devices 210, 212 could allow users to interact with the system through corresponding audio interfaces 200A, 200B, 200C, 201. Likewise, users could access the system via a mobile computing device 203 that also acts as a local device with an audio interface. A mobile computing device might include both a cellular transceiver which connects to the cellular telephone network, and an IP data transceiver that is capable of communicating with a wireless router connected to a data network 220 such as the Internet.

The system also includes a TV show voting module 300 which is designed to receive and possibly tabulate votes for television shows that are being broadcast. If, during a television show, there is a call for an audience vote, the voting could be accomplished in multiple ways. Audience members could still place a telephone call from telephone one 252 or telephone two 250, and those calls or text messages from those telephones, would be connected to the TV show voting module 300 via the telephone network.

Alternately, for audience members that are connected to the system via a local device 210, 212, the audience members could use their audio interface (which could simply be their home telephone) to place a vote. For instance, a user could pick up his phone and say, "I want to vote on issue X." The system would already know that viewers of a television program have been invited to place a vote, so the system could immediately perform a voice application that acts to take the user's voice vote and pass it on to the TV show voting module.

The inherent speech recognition capabilities of the system would allow the user to vote using simple speech commands. There would be no need for the user to know what telephone number to call or what telephone number a text message must be sent to. In fact, the telephone network itself would never be involved in casting or tabulating the votes. Because the vote is being communicated to the TV show messaging system 302 via digital data packets communicated over the data network 220, it would be possible for the TV Show voting module 300 to receive and process a much greater number of audience votes than would have been possible with telephone calls or text messages. In part, this is true because the prior art systems that received votes through the telephone network were limited in terms of the number of votes that could be received because of the limited number of telephone lines that were connected to such systems. Also, voting using a system embodying the invention is less because the audience members can cast a vote without paying to place a telephone call or to send a text message.

In some instances, the TV show voting module 300 could be under the control of the television show producers. In other instances, the TV show voting module might be a third party service that is used by television show producers to receive and tabulate votes. In still other instances, the TV show voting module could be a part of the DVAESA itself. If the TV show voting module is part of the DVAESA, it might be used to tabulate votes from all audience members that are connected to the system, and those votes could then be communicated to the TV show producers in a summary fashion when the voting period has expired.

Voice applications performed on local devices allow the system to interact with users via voice commands. This means that a TV show producer could create a relatively complex VA which can be performed by a user's local device when a user wants to provide input or place a vote in response to an invitation to do so made in a TV program. To date, such input has been limited to voting on simple issues due to the difficulty in receiving and tabulating more complex information. However, because of the increased capabilities of the system, as compared to prior art systems, it would be possible to receive and process much more complex information and feedback from TV show audience members.

For instance, when audience members are invited to provide input on a show, the user could then utilize an audio interface to call up a voice application that has been created by the TV show producers. The VA could ask questions of the user, and the user could provide feedback, in the form of spoken responses. The system could interpret those spoken responses and record the information. In many instances, the system would be able to tabulate and report the responses from multiple users.

Furthermore, if the producers of the television show were willing to pay a fee to the operator of the DVAESA, the system could be configured such that as soon as viewers are invited to cast a vote, and for the duration of the voting period, any time that a user of the DVAESA picks up his telephone to access the system, the system would first ask the user a question such as, "Would you like to vote on issue X?" This would be yet another way to derive advertising or promotional revenue from the DVAESA.

In some instances, users could leave messages in response to an invitation to do so, and the organizers of a television broadcast could select certain messages for broadcast. Here again, the same basic functionality was possible in the past by having users place telephone calls to a central number. But the volume of calls that can be supported by a system as illustrated in FIG. 5 is significantly higher, and the system would eliminate the need to involve the telephone network, which can make providing the messages less expensive.

The above example contemplates an audience member casting votes or providing information in response to an invitation to do so made in a broadcast television program. But there are many other instances where the system could be used to rapidly and inexpensively receive and tabulate information, data and opinions from large numbers of system users.

For instance, local government entities could create a voice application which is designed to ask users their opinions on a variety of local governmental issues. Because these sorts of voice applications would be capable of interacting with users via relatively sophisticated speech recognition techniques, the voice applications could be relatively complex. And the voice application could be designed to distill and tabulate the users' responses and to report the results back to the government entities that created the voice applications.

Polling companies could create relatively sophisticated voice applications that are designed to elicit user opinions on various topics, political candidates, commercial products or other items of interest. And here again, because the voice applications can interact with the users via relatively sophisticated speech recognition techniques, it would be possible to obtain detailed information and opinions from users without the need for live operators.

The inventors contemplate that a system as illustrated in the present application could be used in widely varying ways and for widely varying purposes to rapidly and inexpensively seek, acquire, tabulate and report information from users. Thus, the above-described examples are not intended to be in any way limiting.

Figure 6:
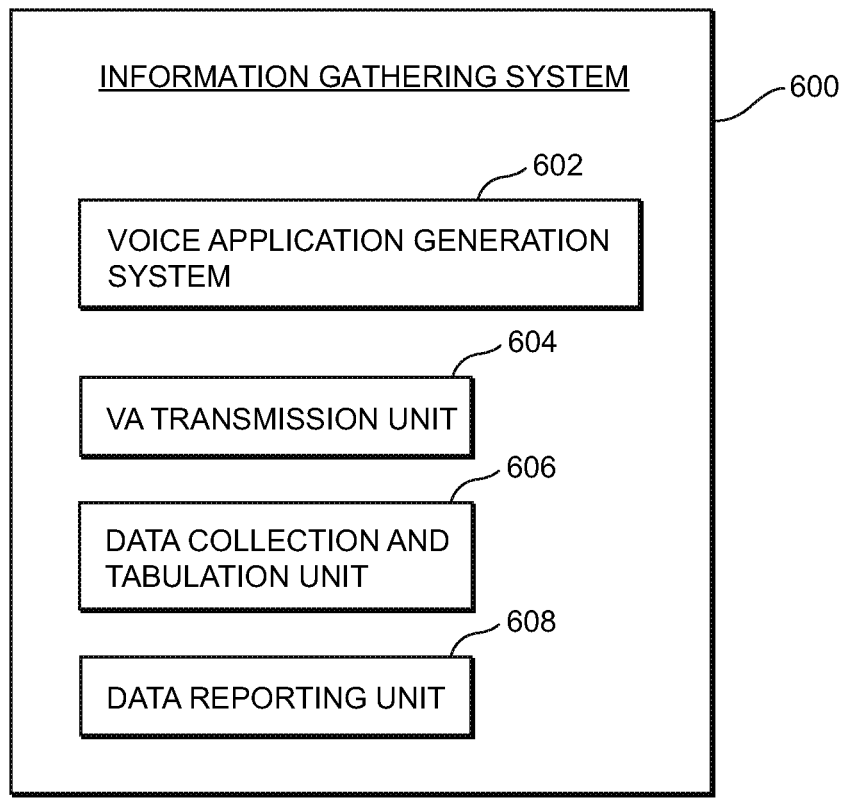
FIG. 6 illustrates elements of an information gathering system embodying the invention.

An example of an information gathering system embodying the invention is illustrated in FIG. 6. The information gathering system 600 includes a voice application generation system 602. The voice application generation system would be used by various parties to create a voice application which is intended to solicit information, opinions and comments from users.

As noted above, different voice applications could be customized for different types of users. For instance, a single entity might wish to create two or more different voice applications which all seek the same information. However, one voice application could be used to collect information from English speaking users, while other voice applications could be used to collect information from users who speak other languages. The system would know what each user's primary language is. As a result, the system could be instructed to deliver and perform the correct language version of the voice application to each of the users based upon what language they speak. The language that each user speaks would never need to be communicated to the parties who create the voice application and who are seeking information from the users. Accordingly, the system ensures the privacy of its users, while still allowing a party seeking information to create and deliver customized voice applications to the users.

The information gathering system 600 also includes a voice application transmission unit 604. Once the voice applications have been created, the voice application transmission unit would be responsible for ensuring that the voice applications are delivered to the users. This could include sending a voice application multiple times to the same user until the user actually responds and interacts with the voice application to provide the desired information.

The information gathering system 600 also includes a data collection and tabulation unit 606. The data collection and tabulation unit 606 would receive information back from the voice applications that are performed to the users. This could include merely collecting voice votes or far more sophisticated ways of collecting and analyzing the data which is received from the users.

Finally, the information gathering system 600 also includes a data reporting unit 608. The data reporting unit would be configured to generate various reports based on the information received from the users.

In all the above examples, voice applications can interact with users, and the information the users provide can be tabulated and delivered to an entity without the need to place any telephone calls. All communications passing back and forth between the system and the users and between the system and the party commissioning an information seeking voice application would take place over the data network. The fact that no live operators are required, and the fact that no telephone system assets are used can greatly reduce the cost of obtaining information from users.

Moreover, because neither live operators nor telephone lines are required to gather the information from users, the information can be gathered from much greater numbers of users in a given period of time than would have been possible with prior art systems which utilize live operators calling members of the public over existing telephone lines.

A system as illustrated in FIG. 5 could also be used to deliver information to users in a rapid and inexpensive fashion. The information delivered to the users could be audio information played to the users. In other embodiments, the information could be delivered to users in the form of audio/video messages. In still other embodiments, the information could be delivered to users in the form of text.

As one example, assume that TV show producers wish to send an audio message to all registered members of a television program fan club. The TV show producers would create one or more audio messages that are then stored on and delivered from a TV show messaging system 302. The audio messages could be distributed via the data network directly to the users' in the form of a voice application that is performed on the users' local devices. In other instances, a voice application may ring the user's telephone or audio interface and then play the audio message. Alternately, the audio messages could be delivered straight to the users' voice mailboxes. In still other instances, the audio messages might be routed straight to an individual user's audio interface.

As noted above, it may be common for multiple users to access the system via the same local device and/or the same audio interface. In the embodiment illustrated in FIG. 5, the local device 210 is coupled to User 1's audio interface 200A, User 2's audio interface 200B and User 3's audio interface 200C. Also, the local device 212 is coupled to only a single audio interface 201, but that audio interface might be used by User 4, User 5 and User 6.

If a particular audio message is intended for User 5, the audio message could be send directly to User 5's voicemail box. If the audio messages are delivered straight to an individual's voicemail box, one can ensure that the right party receives the message, even through User 4, User 5 and User 6 all share the same local device 212 and the same audio interface 201. This sort of functionality would have been impossible with a prior art system.

In a similar fashion, if an audio message is intended for User 2, the audio message could be routed directly to User 2's audio interface 200B, but not to any other of the audio interfaces coupled to the local device 210 at that residence. In this instance, a voice application being performed on the local device 210 would need to be able to distinguish among the audio interfaces to which it is connected. And the voice application would then selectively interact with just one of the audio interfaces. Here again, the system makes it possible to deliver an audio message directly to an intended user, even though multiple users may reside at the same location and share access to the system thorough a common local device interface.

It might also be possible for the TV producers to specify that one type of message be delivered to users having a first set of personal characteristics, and that a second different message be delivered to users having a different set of personal characteristics. Because the system would know some information about the users, the proper messages could be delivered to each of the users, and there would be no need for the TV show producers to ever come into possession of the user's personal information. This would allow for customized messages to be delivered to users without violating any user privacy.

As explained above, when a prior art centralized voice services platform attempted to deliver an audio message to many users, it required a large amount of time and intensive use of telephone network assets to deliver the same audio message to all of the users. The centralized voice services platform could only place a certain number of simultaneous calls because of the limitation on the number of telephone lines that are connected to the platform. Thus, a series of call would need to be placed using the limited number of outgoing lines until all necessary calls are made.

In contrast, with a system as illustrated in FIG. 5, because the audio messages are bring delivered through the data network, it is possible to distribute the message to all users in a much shorter period of time. And because the messages are delivered without the need for an expensive centralized voice services platform, or the involvement of the telephone network, the messages can be delivered for a significantly lower cost. Also, the use of a system as illustrated in FIG. 5 makes it possible to accomplish functions that were impossible with the prior art systems, such as the delivery of customized messages to individual users, and the delivery of audio messages straight to an individual's voice mail account or the user's personal audio interface.

As noted above, the delivery of audio messages is just one way that the system could be used to rapidly deliver information to users. Instead of audio messages, the system could be delivering video messages, or text messages, providing the receiving systems are capable of processing these alternate forms of information. Here again, the messages could be delivered more rapidly and less expensively than with prior art systems, and the messages could be better targeted to individual users.

Also, instead of sending users an audio, video or text message, the system could instead deliver and perform a voice application that is designed to provide users with individualized information. The voice application could be designed to play or display different messages depending on the user's personal characteristics, as known by the system. Also, this sort of a voice application could be designed to interact with the user, via voice commands and responses, to deliver to a user just the information of particular interest to that user. Thus, a system embodying the invention could deliver information and content to a user in a highly personalized and user-friendly fashion.

Figure 7:
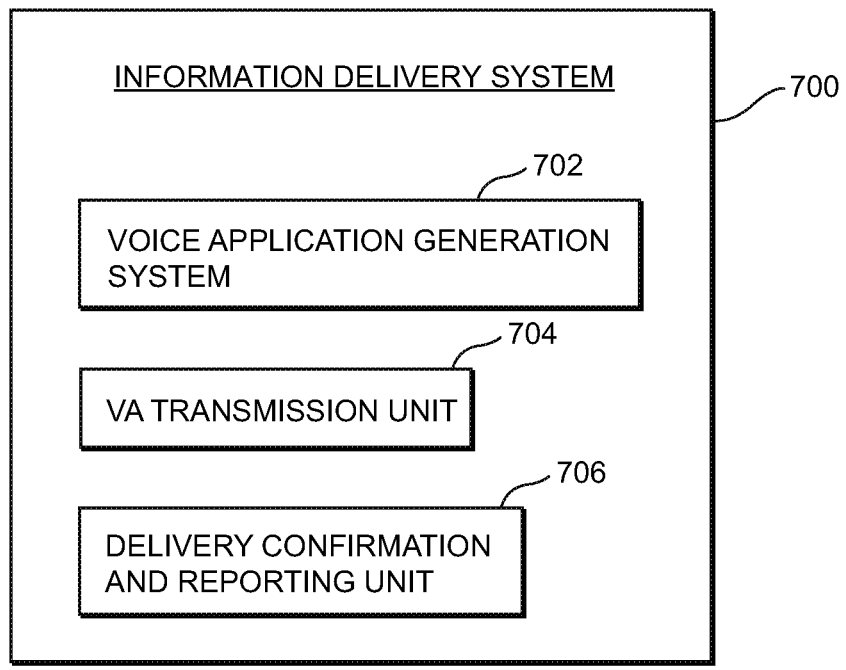
FIG. 7 illustrates elements of an information delivery system embodying the invention.

FIG. 7 illustrates a typical information delivery system 700 which could be used in a system embodying the invention. The information delivery system 700 includes a voice application generation system 702. The voice application generation system 702 would be used to create voice applications which deliver messages to users.

Basically, a person or entity wishing to create a message which is to be delivered to a user would do so via a voice application. The voice application would then be delivered to the user's local device, and a voice application agent would actually perform the voice application for the user. This could involve playing an audio message, displaying text or playing a video message. As also noted above, the voice application could interact with the user, via speech commands, to provide the user with information of particular interest to the user.

As noted above, the voice application could be designed to provide customized information to the user based on the user's personal characteristics. For instance, a variety of similar voice applications could be used to deliver the same message to users in different languages. Alternatively, some voice applications could be designed to deliver information to females, whereas another voice application could be designed to deliver information to males. Any other characteristics of the individual users could also be used to trigger the delivery and/or performance of a customized voice application. Because the entities creating the voice applications do not have access the user's personal characteristics, the user's privacy is preserved. Nevertheless, the messages being delivered to the users can be customized to the users based upon their personal characteristics.

The information delivery system 700 also includes a voice application transmission unit. The voice application transmission unit would be responsible for delivering the voice applications to the users. As noted above, this could include delivering certain types of voice applications that deliver customized messages to individual users based upon their individual characteristics.

The information delivery system 700 also includes a delivery confirmation and reporting unit. The delivery confirmation and reporting unit would confirm that the messages that a party has requested are delivered to users are actually performed for the users. The delivery confirmation and reporting unit 706 could work in concert with the voice application transmission unit to resend individual messages, as necessary to ensure that all users have received the messages that were sent to them.

A DVAESA can also be used to largely replace live operators that receive and process telephone calls from users who wish to make a purchase. The following example focuses on a system designed to work in concert with a television broadcast which is attempting to convince users to purchase specific products. However, a system embodying the invention could also be used in a wide variety of other contexts to replace or eliminate live marketing agents.

For television programs that market goods and services, such as QVC and the Home Shopping Network, the system could also be used to allow users to rapidly and easily make purchases. For instance, if a user's personal information and credit card information are previously stored in the system, this could facilitate a quick and easy purchase function. The user would watch a TV program until a desired item is being shown. The user could then pick up their audio interface, say a key word to communicate directly with the TV show purchase system 304, and then simply speak a "buy" command to purchase the item currently being displayed. Because a voice application could interact with the user via voice commands, the system could eliminate the need for live operators at the TV marketing side.

Also, the system will know what shows are airing at what times, and also what products are being presented at what times. Thus, the system will have knowledge of what the potential purchasers are seeing at any given time. And this information can be used to ensure that the users are performed an appropriate voice application when they choose to interact with the system.

In this example, we are assuming that a user would act to purchase an item at approximately the same time that the item is being displayed on a television broadcast. While that might help to narrow the potential choices available to a user, there is no need for a system embodying the invention to work in this fashion. A user could also utilize their audio interface to ask to speak with a particular vendor, and the audio interface could then be used to purchase a specific item from that vendor.

Also, it is important to note that a system embodying the invention can be configured to interact with any sort of system that offers goods for sale to users, regardless of the details of the system. Voice applications can be custom tailored to interact with the different vendor systems, but still provide a consistent user interface. Thus, a system embodying the invention can allow its users to interact with many different vendor systems in a similar or identical manner, making it easier and more comfortable for the users to purchase items.

Figure 8:
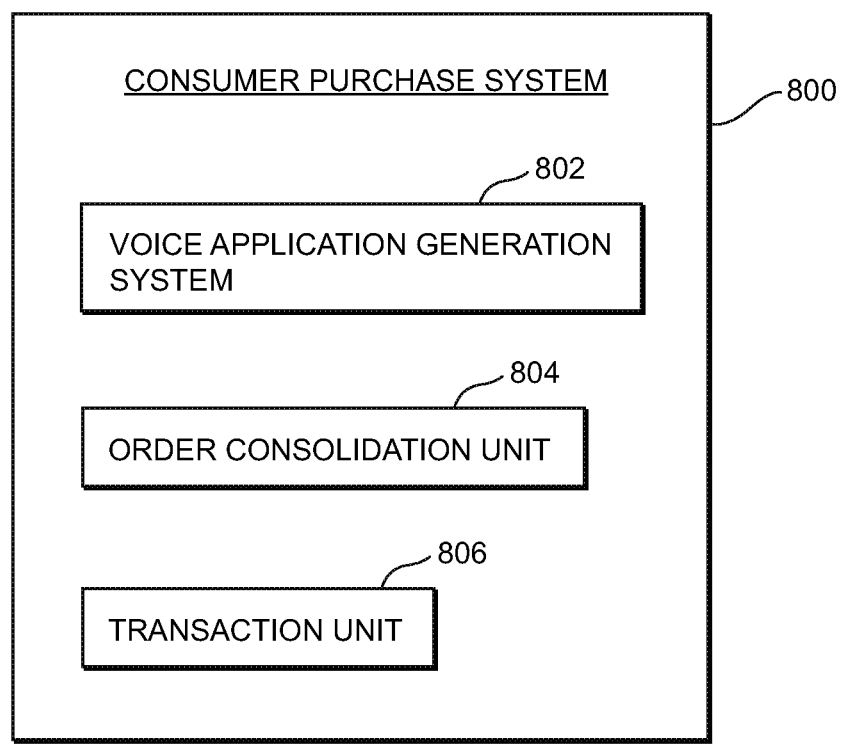
FIG. 8 illustrates elements of a consumer purchasing system embodying the invention.

A consumer purchasing system embodying the invention is illustrated in FIG. 8. As shown in FIG. 8, the consumer purchasing system 800 includes a voice application generation system 802. The voice application generation system 802 would be used by various vendors to create individual voice applications which are intended to interact with users to allow the users to purchase various items.

In the example explained above, it was assumed that a user would access the system through his audio interface to purchase an item which was being shown in a television broadcast. In this type of situation, the operator of the broadcast would have already created a voice application which is intended to interact with users to allow them to purchase the items that are to be shown during a particular broadcast.

The user would utilize an audio interface to first ask to be connected with the sales system of the television broadcast. At that point, the voice application which has been created by the television broadcaster would be performed for the user. The voice application would allow the user to easily purchase one or more of the items being displayed during the broadcast. For instance, the voice application could be configured such that the first item mentioned in a list of available items is the one currently being displayed on the broadcast. The next few items in a list could be the items which were just previously displayed on the broadcast. As the television broadcast progresses, the order of the options that are presented to the user would change as different items are actually being displayed on the program.

In other instances, a vendor having no connection whatsoever to a television broadcast could also create voice applications which are accessible to users of the system. The voice applications would be configured to interact with the user via speech based commands to quickly and easily to allow a user to navigate and purchase goods through the vendor.

A particular vendor could also create multiple different voice applications which are intended to be performed for different types of users depending upon their personal characteristics. As with the examples mentioned above, the vendor itself might never know the particular characteristics of a user. But those characteristics could still be used to select and perform an appropriate voice application which is tailored to that user based on his characteristics.

The consumer purchase system 800 also includes an order consolidation unit 804. The order consolidation unit could work in connection with the voice applications which are being used to sell individual items to ensure that as soon as an item has been sold out, the voice applications no longer offer that item for sale.

The consumer purchase system 800 also includes a transaction unit 806, which could be used to allow a user to pay for goods which he is purchasing through a voice application. As noted above, if a user's credit card or bank account information is already stored on the system in some form, the system might be able to facilitate a very quick purchase utilizing this pre-stored financial information. In a similar fashion, if a user registers his residence and office addresses with the system, the user can quickly and easily ask that any purchased items be delivered to a specific address connected with the user.

Once a user's basic information has been entered into the system, a voice application with speech recognition capabilities could allow a user to make a very quick and easy purchase of an item. For instance, a user could activate their audio interface and ask to be connected to a particular vendor's voice application. The user could then simply make a statement such as "purchase item number 51, using my American Express card, and deliver the item to my home." A voice application could then process the speech based commands and take the required action without any further input by the user.

A system embodying the invention might also be capable of pulling a user's financial information from some other system. Thus, a user might be able to authorize a voice application to charge a user account on some other financial transaction system.

In the example given above, where a user wishes to purchase an item being displayed on a television broadcast, one of the limitations of the prior art systems involved users attempting to place a telephone call to live operators to make the purchase. As with all of the above-described prior systems, there will only be a limited number of live operators and a limited number of telephone line connections to the vendor. This places great constraints on the number of calls which can be simultaneously received from users wishing to make a purchase.

In contrast, with a system and method embodying the invention, a large number of users can simultaneously place orders and no constraints will be imposed based on a number of live operators or a number of telephone lines available to process calls. As also described above, because the live operators are no longer required and because there is no use of the typical telephone system, the cost of operating such a system is considerably less expensive than with prior art systems. Moreover, a user's personal characteristics can be taken into account to provide the user with a custom tailored voice application, with the need to communicate the personal information to the actual vendors.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although the invention has been described with reference to a number of illustrative embodiments thereof, it should be understood that numerous other modifications and embodiments can be devised by those skilled in the art that will fall within the spirit and scope of the principles of this disclosure. More particularly, reasonable variations and modifications are possible in the component parts and/or arrangements of the subject combination within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A method of communicating with a plurality of users who are connected to a distributed voice application execution system via a digital data connection, comprising:
    facilitating generation of a plurality of voice applications that are designed to be performed on a corresponding plurality of user local devices that are operated by a plurality of users, the voice applications being configured to communicate with those users, wherein each of the voice applications is customized for a particular user in some fashion, and wherein the voice applications are configured to be performed for the users upon an occurrence of a triggering event;
    causing the plurality of generated voice applications to be stored, at least in part, on the plurality of respective user local devices so that the voice applications are available for performance on those user local devices upon the occurrence of the triggering event.

2. The method of claim 1, wherein the triggering event is the broadcast of an audio or video program, and wherein the plurality of voice applications are configured to be performed for the users when the audio or video program is broadcast.

3. The method of claim 1, wherein the plurality of voice applications are configured to interact with the plurality of users and to receive information provided by the plurality of users, the method further comprising collecting the information provided by the plurality of users from the plurality of voice applications.

4. The method of claim 3, further comprising reporting the information collected from the plurality of users via the plurality of voice applications.

5. The method of claim 1, wherein the causing step comprises causing the plurality of voice applications to be stored, at least in part, only on respective user local devices that are operated by users having at least one predetermined characteristic in common.

6. The method of claim 1, wherein the facilitating step comprises facilitating the generation of a plurality of voice applications that are customized based on characteristics of the users to which the voice applications are to be performed.

7. The method of claim 1, wherein the causing step comprises causing the plurality of voice applications to be stored, at least in part, on the plurality of user local devices such that the voice applications can be performed substantially simultaneously on the plurality of user local devices.

8. The method of claim 1, wherein the causing step comprises causing the plurality of voice applications to be stored, at least in part, on the plurality of user local devices such that the plurality of voice applications all can be performed during a predetermined period of time.

9. The method of claim 8, wherein the triggering event is the broadcast of an audio or video program, and wherein the facilitating step comprises facilitating the generation of a plurality of voice applications that can only be performed on user local devices while the audio or video program is being broadcast.

10. A method of communicating with a plurality of users who are connected to a distributed voice application execution system via a digital data connection, comprising:
    facilitating the generation of a plurality of voice applications designed to be performed on a corresponding plurality of user local devices and which are configured to communicate with the users of those local devices, wherein each of the plurality of voice applications is customized based on at least one characteristic of the user to whom the voice application will be performed, and where each of the plurality of voice applications is configured to communicate the same information to the users or to request that the users provide the same information;
    causing the plurality of generated voice applications to be stored, at least in part, on the plurality of user local devices upon an occurrence of a triggering event such that the plurality of voice applications are available for performance to the users of those local devices after the triggering event has occurred.

11. The method of claim 10, wherein the facilitating step comprises facilitating the generation of a plurality of voice applications that are each configured to communicate with a user in the language that the user speaks.

12. The method of claim 10, wherein the facilitating step comprises facilitating the generation of a plurality of voice applications that are each configured to communicate with a user who is located in a different geographical location.

13. The method of claim 10, wherein the facilitating step comprises facilitating the generation a plurality of voice applications that are customized for users having at least one common characteristic.

14. A system for communicating with a plurality of users who are connected to a distributed voice application execution system via a digital data connection, comprising:
  means for facilitating generation of a plurality of voice applications that are designed to be performed on a corresponding plurality of user local devices that are operated by a plurality of users, the voice applications being configured to communicate with those users, wherein each of the voice applications are customized for a particular user in some fashion, and wherein the voice applications are configured to be performed for the users upon an occurrence of a triggering event; and
  causing the plurality of generated voice applications to be stored, at least in part, no the plurality of respective user local devices so that the voice applications are available for performance on those user local device upon the occurrence of the triggering event.

15. A system for communicating with a plurality of users who are connected to a distributed voice application execution system via a digital data connection, comprising:
  a voice application generation unit that facilitates the generation of a plurality of voice applications that are designed to be performed on a corresponding plurality of user local devices that are operated by a plurality of users, the voice applications being configured to communicate with those users, wherein each of the voice applications is customized for a particular user in some fashion, and wherein the voice applications are configured to be performed for the users upon the occurrence of a triggering event; and
  a voice application transmission unit that causes the plurality of generated voice applications to be stored, at least in part, on the plurality of respective user local devices so that the voice applications are available for performance on those user local devices upon the occurrence of the triggering event.

16. The system of claim 15, wherein the voice application generation unit facilitates the generation of a plurality of voice applications that are configured to interact with the plurality of users and to receive information provided by the plurality of users, and wherein the system further comprises a data collection unit that is configured to collect information provided by the plurality of users from the plurality of voice applications.

17. The system of claim 16, further comprising a reporting unit that reports the information collected from the plurality of users via the plurality of voice applications by the data collection unit.

18. The system of claim 15, wherein the voice application generation unit facilitates the generation of a plurality of voice applications that are each customized based on at least one characteristic of the user to whom the voice application will be performed.

19. The system of claim 15, wherein the voice application generation unit facilitates the generation of a plurality of voice applications that are each configured to be performed by a voice applications agent on a user's local device.

* * * * *